United States Patent [19]

Tajima et al.

[11] 4,020,568
[45] May 3, 1977

[54] PLANETARIUM MOON PROJECTOR

[75] Inventors: Yuzo Tajima; Toru Okada, both of Toyokawa, Japan

[73] Assignee: Minolta Camera Kabushiki Kaisha, Osaka, Japan

[22] Filed: Mar. 24, 1976

[21] Appl. No.: 670,024

[30] Foreign Application Priority Data

Apr. 4, 1975 Japan .................. 50-46316[U]
May 8, 1975 Japan .................. 50-56548

[52] U.S. Cl. ............................................. 35/42.5
[51] Int. Cl.² .................................... G09B 27/00
[58] Field of Search ................................. 35/42.5

[56] References Cited

UNITED STATES PATENTS

| | | | |
|---|---|---|---|
| 2,178,352 | 10/1939 | Unglaube et al. | 35/42.5 |
| 2,632,359 | 3/1953 | Spitz | 35/42.5 |
| 2,827,830 | 3/1958 | Vaux et al. | 35/42.5 |
| 3,312,142 | 4/1967 | Shistovsky | 35/42.5 |
| 3,589,035 | 6/1971 | Vickery | 35/42.5 |
| 3,934,358 | 1/1976 | Kitano et al. | 35/42.5 |

*Primary Examiner*—William H. Grieb
*Attorney, Agent, or Firm*—Wolder & Gross

[57] ABSTRACT

A planetarium moon projector of the direct casting type includes two alternatively interchangeable occulting elements which rotate at twice the period of moon phasing to intercept the projected light beam and effect the waxing and waning of the moon, and which are conically shaped with the same convergent angle as the projected convergent light and with an occulting relief angle. Two intermittent gears revolve integrally with the occulting elements and there is provided a fixed cylindrical rail with a rack, which keeps contact with the intermittent gears, and which interchanges the occulting elements when the intermittent gears are engaged with the rack. An eccentric drive coupling is provided to correct the dislocation of the moon phase caused by the occulting relief angle.

10 Claims, 23 Drawing Figures

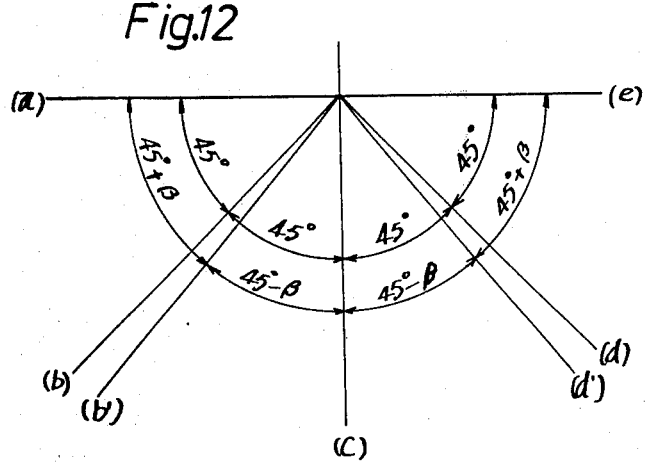
Fig.12
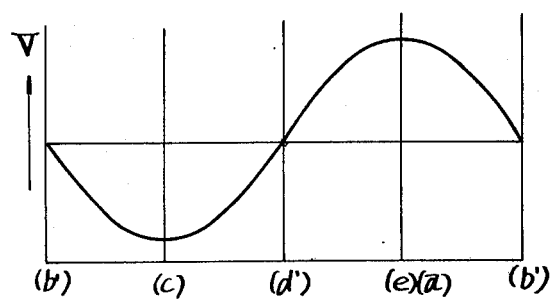
Fig.13
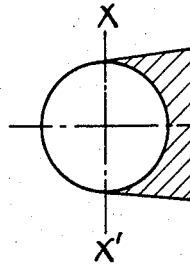 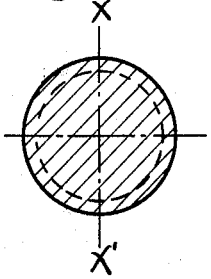 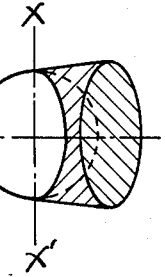
Fig.14(a)   Fig.14(b)   Fig.14(c)
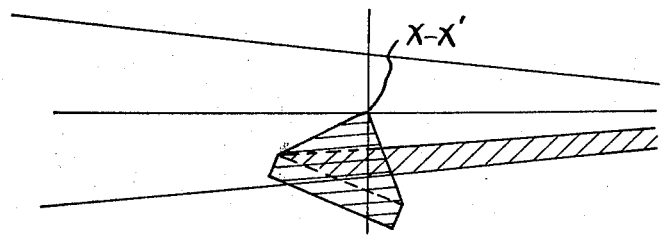
Fig.15

PLANETARIUM MOON PROJECTOR

BACKGROUND OF THE INVENTION.

The present invention relates generally to improvements in planetarium projector devices and it relates more particularly to an improved phase changing moon projector for planetariums. At present, two tupes of moon projectors are generally available. One is of the direct casting type which projects the waxing and waning of the moon by directly occulting the projected light, and the other is of the reflecting type which lightens a moon-shaped spherical body with a lamp and projects the waxing and waning of the moon indicated by the reflection of the light from the revolving spherical body. The moon projector of the direct casting type is superior to that of the reflection type because of its simple, compact construction.

The moon projector of the direct casting type employs a condenser lens to collect the diffused rays of light from the lamp, forms an image of the full moon by passing the light through the full moon plate delineating or containing the shape and pattern of the full moon, and directs the image on the screen by a projection lens while effecting the waxing and waning of the moon by occulting the light travelling through the full moon plate with an occulting element located between the plate and the projection lens.

The occulting element contains a concave semi-circular cylindrical surface or U-grooved cylinder which is cut in the rectangular direction, i.e. at the right angle to the axis of the cylinder with a cutter having the same diameter as the cylinder. As the occulting element turns, the projected image changes from the full to the new moon, and then vice versa.

The cycle from a full moon to another full moon can be accomplished by turning the occulting element for 180°. When turning the occulting element further to change the full moon to the new moon, however, the projected image of the moon becomes different from the real one. Therefore, the occulting element is changed with another occulting element having a rectangular inclination against and the same shape as the first element, and the second element turns round to represent the continuous waxing and waning of the moon.

The conventional mechanism for switching the occulting elements uses a spring. When the spring is released from its maximum compression point to replace one element with another, the replacing element strikes against the component which keeps the element fixed at a certain position. The impact tends to jerk the moon projector, and the movement of the element by a compression of the spring ends to distort the image of the moon. When the annual motion is reversed immediately after the change to the element, the normal image of the moon is not projected because of the failure of the occulting element to return. In addition to this disadvantage, when two projectors of the direct casting type, each provided with a respective occulting element, replace each other, their lamps flicker on the occasion of the full moon and the spectator does not fully visualize his presence at the true scene, because the image of the full moon flickers for a moment.

In the case of the conventional projector, the condenser lens has a large aperture because of the need to collect a large amount of light, while its projection lens has a small diameter. Therefore, the light travelling from the condenser lens to the projection lens converges to direct it effectively on the screen.

As explained above and illustrated in FIG. 1 ($a$), the plan view, and FIG. 1 ($b$), the frontal cross-sectional view, the conventional occulting element is a semi-circular cylindrical U-grooved cylinder (hereinafter called the "cylindrical occulting element"). Therefore, the waxing and waning of the moon are projected by equalizing the diameter of the cylindrical occulting element with that of the convergent light at the rear of the element in the travelling direction of the convergent light and turning the element around its rotating $X-X'$.

Accordingly, the diameter of the cylindrical occulting element would become larger as compared with the diameter of the convergent light at the rotating axis $X-X'$ as shown in FIG. 1 ($b$) and such projected image is unable to reproduce a crescent moon having a sharp cut edge.

Furthermore, if the diameter of the cylindrical occulting element is made equal to the diameter $a$ of the convergent light on the rotary axis $X-X'$ as in FIG. 3, the element does not function well as an occulting element because of the leak of light on the occasion of the crescent moon or the new moon.

Such being the case, the cylindrical occulting element, whatever diameter it may have, makes it possible only to project an image which is different from the real image of the moon.

SUMMARY OF THE INVENTION

It is a principal object of the present invention to provide an improved planetarium projector.

Another object of the present invention is to provide an improved planetarium moon projector.

Still another object of the present invention is to provide an improved moon projector of the type where occulting members move across the moon image projecting beam.

A further object of the present invention is to provide an improved device of the above nature characterized by its simplicity, ruggedness, reliability, accuracy in its reproduction of the actual phasing of the moon, and its great versatility and adaptability.

The above and other objects of the present invention will become apparent from a reading of the following description taken in conjunction with the accompanying drawings which illustrate a preferred embodiment thereof.

In a sense the present invention contemplates the provision of an improved planetarium moon projector comprising means for producing a circular light beam, a projector lens disposed forwardly of and along the optical axis of the light beam, a rotor rotatable about a first axis perpendicular to and intercepting the optical axis, a pair of first and second occulting members supported by and rotatable with the rotor and alternatively into an operative occulting position relative to the light beam between the beam producing means and the projector lens, and means responsive to the rotation of one of the occulting members through a predetermined position about the first axis for interchanging the other occulting member therewith at the operative position.

Another feature of the present invention resides in the configuration of the occulting member which is of conical shape having the same angle of convergence as the convergent circular light beam and provided diametrically across its apex and with a semicircular cylindrical groove. In the operative position of the occulting member it rotates about the first axis and about its reduced end and in its fully occulting position the groove is perpendicular to and its axis intercepts the first and optical axes and its outer periphery coincides with that of the beam, the diameter of the groove being equal to that of the beam along the first axis. Each occulting member is provided with an occulting relief angle to prevent a wicked or abrupt occultation during occulting member interchange and an eccentric varying speed drive is provided for rotating the occulting member to compensate for the phase aberrations or changes in occultation consequent to the occulting relief angle.

In the preferred structure the rotor carries a rockable transverse shaft to which is affixed a bracket which carries the occulting members in quadrature or 90° relationship. The rotor is surrounded by a ring which supports a short rack, and gear members are affixed to opposite ends of the shaft and each engages the rack for each 180° rotation of the rotor during the non-occulting or full moon position of the operative occulting member to rock the bracket 90° and interchange the occulting member at the operative position. At other positions of the rotor the ring locks the gear members against axial rotation to maintain a respective occulting member in its operative position.

The improved planetarium moon projector is reliable, simple and rugged and provides an accurate true representation of the phasing of the moon in the absence of any disconcerting discontinuities or interruptions.

BRIEF DESCRIPTION OF THE DRAWINGS

FIG. 1 (*b*) is a frontal cross-sectional view of the occulting element in FIG. 1 (*a*);

FIG. 12 indicates the phase relationship between the real moon and the projected moon;

FIG. 3 illustrates the relationship between the revolving speed (V) of the occulting element drive and the period or phase of the moon.

FIG. 14 (*a*) represents the full moon when the occulting element of FIG. 8 is used;

FIG. 14 (*b*) illustrates the new moon when the occulting element of FIG. 8 is used;

FIG. 14 (*c*) indicates the moon on the seventeenth night using the occulting element of FIG. 8;

FIG. 15 shows the position of the occulting element against the moon on the seventeenth night as in FIG. 14 (*c*).

DESCRIPTION OF PREFERRED EMBODIMENTS

Figure 1A:
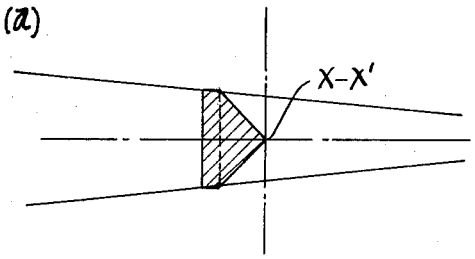
FIG. 1 (*a*) is a plan view of a conventional moon projector cylindrical occulting element.
Figure 1B:
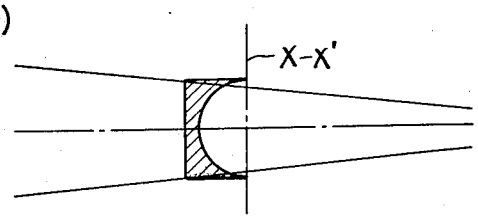
Figure 2A:
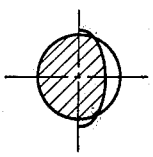
FIG. 2 (*a*) and (*b*) represent different images of the moon with the occulting element in FIG. 1 (*b*)
Figure 2B:
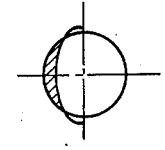
Figure 3:
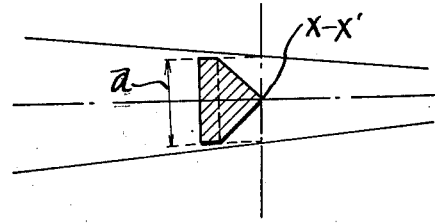
FIG. 3 is a plan view of another conventional moon projector cylindrical occulting element.
Figure 4:
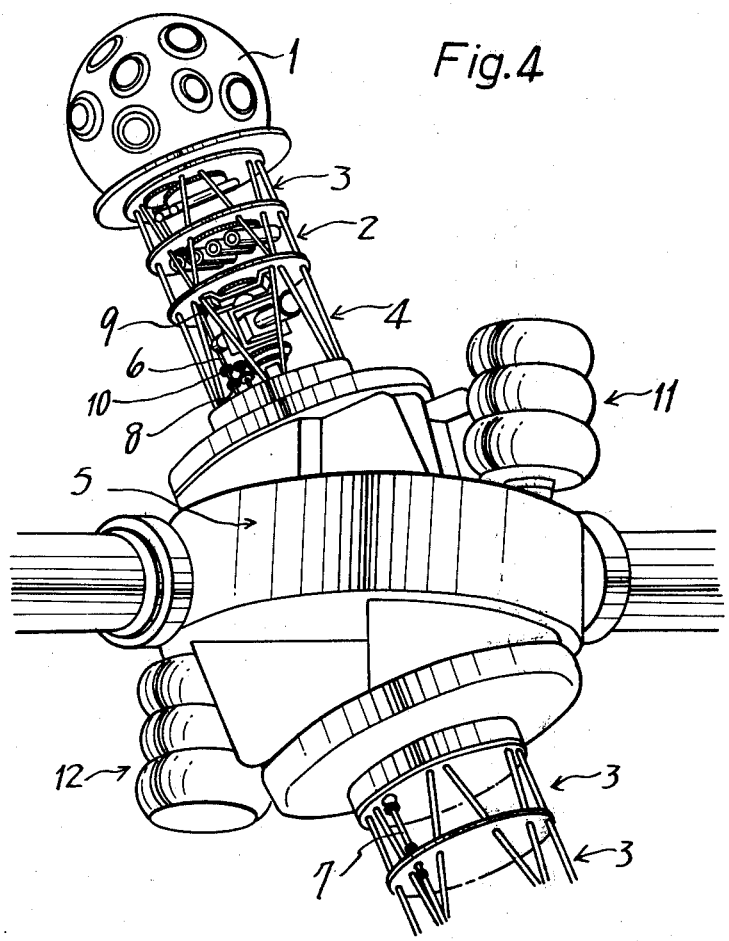
FIG. 4 is a front perspective view of a planetarium equipped with a moon projector embodying the present invention.

Referring now to the drawings which in FIGS. 4 to 15 illustrate a preferred embodiment of the present invention, in FIG. 4 is illustrated a planetarium of the Zeiss type wherein the upper half is for the northern sky and the lower half is for the southern sky. Each planetarium projector half is equipped with a fixed star projector 1, one for the northern sky and another (not shown) fixed star projector for the southern sky. Installed between projector halves are a sun projector 2, planet projectors 3 and the moon projector 4. The central driving mechanism 5 causes the planetarium to perform the daily revolving motion about the polar axis, once a day.

The central driving mechanism 5 also drives the sun projector 2, the planet projectors 3 and the moon projector 4 to revolve, through the northern and southern annual driving shafts 6, 7, for projecting the independent annual motion of the sun, the planets and the moon on the sky which thus perform their daily motion. As these motions are performed, through the driving gear 8 for the sidereal moon cycle, the moon projector 4 performs a motion similar to that of the real moon as viewed from the earth by combining the motion through the driving gear 9 for the period of moon phasing with that through the driving gear 10 for the lunar nodal regression cycle.

Installed on both the northern and southern sky sides are projectors 11,12 for the coordinate systems of the ecliptic, the equator and the equatorial grid.

Figure 5:
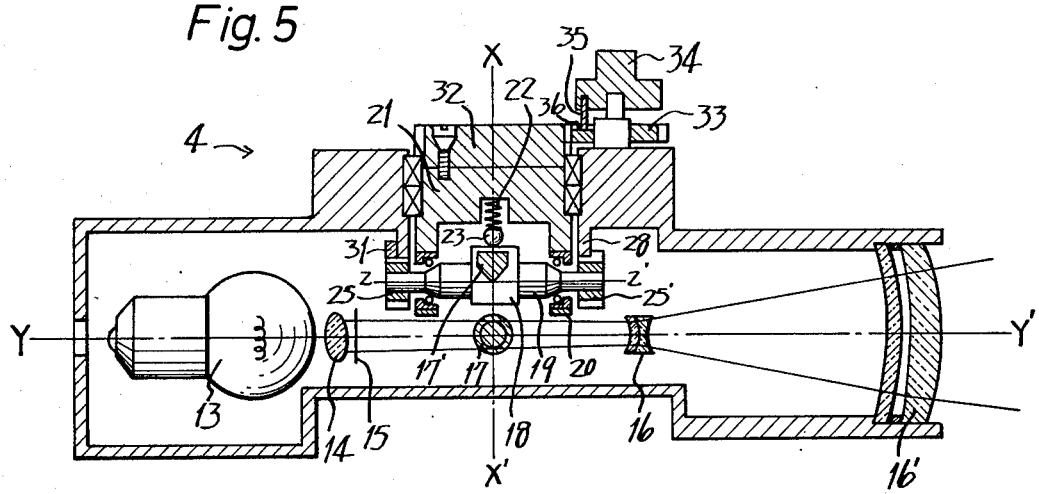
FIG. 5 is a medial longitudinal cross-sectional view of the improved moon projector of the present invention.
Figure 6:
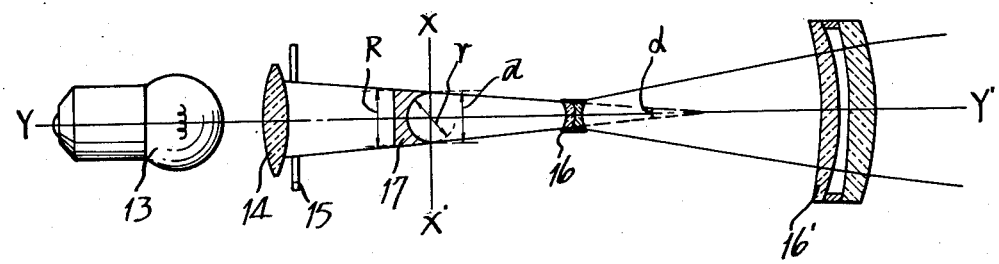
FIG. 6 is a longitudinal view of the optical arrangements of the moon projector of FIG. 5.
Figure 7:
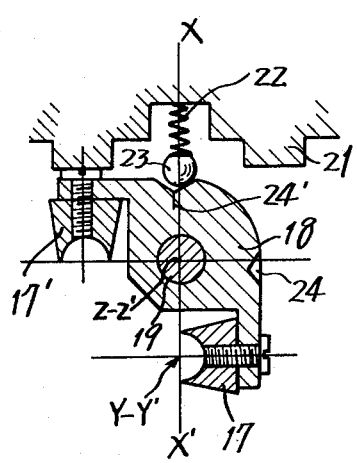
FIG. 7 is a fragmentary medial transverse cross-sectional view of the moon projector shown in FIG. 5.

As shown in FIGS. 5, 6 and 7, the moon projector 4 is equipped with a lamp 13, a condenser lens 14 for collecting the rays of light from the lamp, a full moon plate 15 designed to change or delineate the projected light from the lamp 13 onto the outline of the full moon, and projection lenses 16, 16' on the optical axis Y–Y' for projecting the full moon onto the unshown screen. The condenser lens 14 in general has a large aperture because of the need to gather as much light as possible, while on the other hand the projection lens 16 has a small aperture. For this reason, the light travelling from the condenser lens 14 to the projection lens 16 must be projected as convergent light in order to effectively project the light traversing the lens 14 onto the screen. The vertical angle of the convergent light is designated to equal to angle α.

Figure 8:
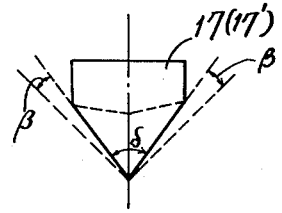
FIG. 8 is a plan view of the improved occulting element employed in the improved moon projector.

Referring to FIG. 8, the reference numerals 17,17' respectively designate a concave cylindrical or U-grooved conical occulting element wherein each vertical angle of the conical portion is equal to the vertical angle of the condenser lens convergent light and each is manufactured by cutting by a suitable cutter along the rectangular or quadrature transverse direction relative to the axis of the cone at an inclined angle equalling to relief angle β for preventing the abrupt occultation upon replacement of one conical occulting element with the other. As the diameter of the cutter to be used for the above purpose is equal to the diameter *a* of the convergent projected light at the rotating axis X–X' about which each of said U-grooved conical occulting elements 17,17' rotate for occultation, the diameters for smaller and larger sides would be γ and R respectively, the vertical angle for the cone be α, the relief angle to β and the plane angle to be δ which equals to (90° - 2β) for the occulting element. The occulting elements 17,17', inclined perpendicularly to each other and held on a mount 18, revolve about the rotary axis X-X' perpendicularly intercepting optical axis Y-Y'. The occulting elements are so provided and disposed as to occult the projected light from the full moon plate 15 to the projection lenses 16,16' on the optical axis Y-Y'. The mount 18 is located on a base 21 which revolves about the axis X-X', at twice the period of the moon phasing through the transversal shaft 19 and the bearing 20. Z-Z' is a rotary axis perpendicularly intersecting the axis X-X' about which mount 18 revolves for alternately replacing or changing the occulting elements 17,17' which rotate about the optical axis Y-Y' for occultation. Both a spring 22 and a detent or ball 23 act along the direction of the axis X-X' and stabilize and index the mount 18 provided with the occulting elements 17,17' on the base 21 by releasably engaging or pressing the indexing recesses or ports 24,24' on the mount 18.

Figure 9:
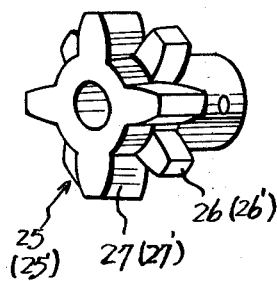
FIG. 9 is a perspective view of the intermittent gear employed in the occulting element transfer mechanism.

Referring to FIG. 9 which shows the driving means for transfer or replacement of the occulting elements 25 and 25' are intermittent gears provided at respective ends of the transverse shaft 19. The gears 25,25' comprise eight intermittent teeth 26,26' and four intermittent teeth 27,27' lacking half the tooth thickness of every other tooth so as to rotate the transverse shaft 19 for 90° about the axis Z-Z'.

Figure 10:
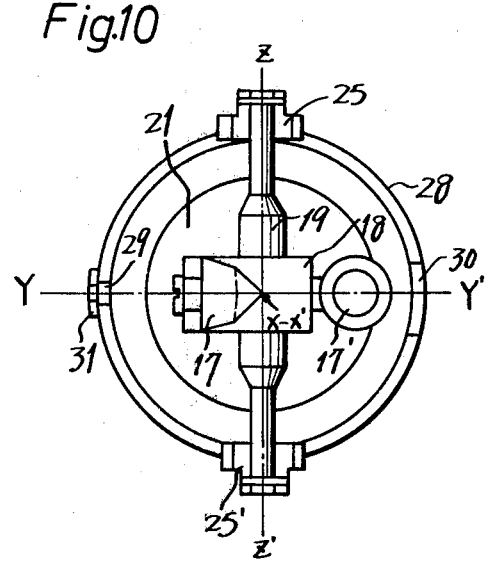
FIG. 10 is the bottom plan view of the occulting member drive assembly of the moon projector of FIG. 5.
Figure 11A:
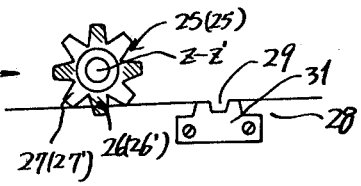
FIG. 11 (*a*) – (*e*) are elevational views showing the sequence of movement of the intermittent gear of the occulting member transfer mechanism.
Figure 11B:
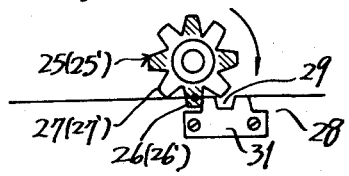
Figure 11C:
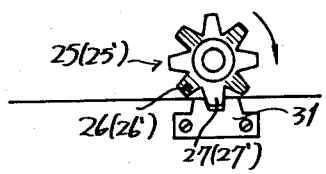
Figure 11D:
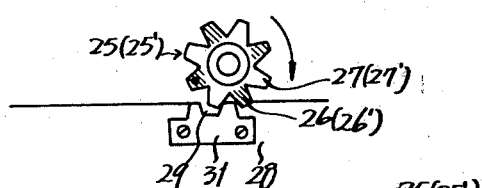
Figure 11E:
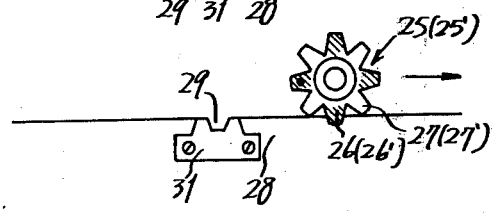

As seen in FIGS. 5 and 10, the four intermittent teeth portion 27,27' of gear 25,25' rotatably register with a fixed cylindrical rail 28 while the four teeth of half thickness of the eight intermittent teeth 26,26' register with the side of cylindrical rail 28 for rotation about the axis X-X'. The cylindrical rail 28 includes two grooves 29,30 aligned along a line parallel to the optical axis Y-Y' wherein the first groove 29, as shown in FIGS. 11 (a)-(e), is so formed to receive a tooth of said intermittent gear 25,25'. To the side of the groove 29 of the cylindrical rail 28 there is provided a two tooth rack 31 for meshing with the eight tooth portion 26,26' while the four tooth portion 27,27' meshes with the groove 29 for rotating the transverse shaft 19 and the mount 18 for 90° about the axis Z-Z'. The other groove 30 is for the rotary relief of the intermittent gears 25,25' when either of them is in meshing rotation with the groove 29, As seen in FIG. 5, a gear 32 is coaxially affixed to the base 21 and is driven by a gear 33 whose revolving speed is set at V (FIG. 13). The drive is transmitted from the driving gear 9 for the period of moon phasing (FIG. 4). The transmission shaft 34 engages a radial or lengthwise groove 36 in the gear 33 which is eccentric to the shaft 34 itself via a pin 35 fixed to shaft 34. The eccentricity between the transmission shaft 34 and the gear 33 is intended to eliminate the phasic dislocation of the occulting elements 17,17' caused by the setting of the relief angle β of the angle δ on the plane of the occulting elements 17,17'. FIGS. 12 and 13 show the phasic relations between the real moon and the projected moon as well as the relations between the period of moon phasing and the revolving speed of the occulting elements 17,17' or the gear 32.

FIGS. 14 (a)-(c) indicate the conditions of the moon caused by the conical occulting elements 17,17'. The full moon is shown in (a), the new moon in (b) and the moon on the seventeenth night in (c). FIG. 15 illustrates the position of the occulting elements 17,17' for the moon on the seventeenth night in FIG. 14 (c).

In operation, turning the unillustrated group of projection switches will energize the projector 1 for projecting the fixed stars on the northern and southern skies and similarly energize the respective projectors for the sun, planets and the moon by means shown in FIG. 4. All of the projected images will perform their daily motions through the central driving part 5, while the sun, the planets and the moon will perform their annual motions. The projected moon image will appear identical to the real moon as seen from earth due to the integration of these three motions of the moon phasing cycle, the sidereal moon cycle and the linear nodal regression cycle.

In FIG. 5, the moon image will be projected onto the unillustrated screen by the projection lenses 16,16' after the light from the lamp 13 is condensed by the condenser lens 14, and delineated or shaped into the full moon by the full moon plate 15. The occulting elements 17,17' are located between the full moon plate 15 and the projection lens 16, and the waxing and waning of the moon is effected by occulting the projected full moon. In the positions shown in FIGS. 5 and 7, the projected light forms the full moon on the screen without being occulted as shown in FIG. 14 (a), for the conical or longitudinal axis of occulting element 17 crosses perpendicular to the direction of the optical axis.

Then when the drive is transmitted from the central driving mechanism 5 to the transmission shaft 34 via the gear 9, for the period of moon phasing, the gear 33 is revolved via the lengthwise groove 36 engaged by the eccentric pin 35 of the transmission shaft 34, and the gear thus revolves. When the gear 32 revolves, the mount 18, the occulting elements 17,17', the transverse shaft 19 mounted on the base 21 through bearing 20 and the base 21 integrated with the gear 32 rotate about the axis X-X'. On this occasion, the intermittent gears 25,25' at opposite ends of the transverse shaft 19 cause the transverse shaft 19, the mount 18 and the occulting elements 17,17' to rotate only about the axis X-X' without rotating about the axis Z-Z', for two teeth of the four intermittent teeth 27,27' of the intermittent gears 25,25' rotate along the cylindrical rail 28 and the eight intermittent teeth 26,26' rotate along the side of the cylindrical rail 28. Such rotation causes the occulting element 17 to occult the projected light from the full moon plate 15 to the projection lens 16. The occulting element 17 will move onto the optical axis Y-Y' as shown in FIG. 6 when it rotates about the axis X-X' for 90° from the full moon position in FIGS. 5 and 7.

As the diameter γ of the occulting element 17 for the side of the axis X-X' is equal to the diameter of the convergent light from the full moon plate on the axis X-X' and as the diameter R for the opposite side of the axis X-X' is equal to the vertical angle of the convergent light or the vertical angle of cone, the occulting element completely occults the convergent light and thus forms the new moon without projecting any moon image as shown in FIG. 14 (b).

In the case of a moon between the full moon and the new moon, for example, the moon on the seventeenth night, the occulting element 17 is located with an inclination toward the optical axis Y-Y' as illustrated in FIG. 15, and it forms the shadow part of the moon by occulting some part of the convergent light. Therefore, the projected moon image will wane a little as shown in FIG. 14 (c). On this occasion the ecliptic caused by the diameter γ of the occulting element 17 will coincide with the circle caused by the diameter α of the convergent light on the axis X–X', and the waxing and waning of the real moon is reproduced.

The occulting element 17 deviates from the axis Y–Y' when it revolves further from the new moon position. A part of the projected light shows the crescent moon on the screen and it gradually changes into the first quarter moon. The occulting element 17 fails to occult the projected convergent light when it makes a 90° turn around the axis X–X' from the new moon position and then a 180° turn from the previous full moon position. Then the full moon is projected again. If the occulting element 17 is rotated further, the projected moon image will differ from the real waxing and waning of the moon. Thus the occulting element 17 is replaced with the other occulting element 17' on the occasion of the full moon, and the element 17' is shifted or transferred to the position of the element 17 shown in FIGS. 5 and 7. Let the element 17' turn around the axis X–X' as is the case with the element 17, the waxing and waning of the moon is thus continuously reproduced.

The replacement of the element 17 with the element 17' is effected by turning the transverse axis 19 and the mount 18 around the axis Z–Z' for 90° through the intermittent gears 25,25'. Immediately before the replacement, as shown in FIG. 11 (a), the four intermittent teeth 27' of the intermittent gear 25' slide along the cylindrical rail 28 and the eight intermittent teeth 26' slide along the side of the cylindrical rail 28. When the intermittent gear 25' reaches the groove 29 of the cylindrical rail 28, the eight intermittent teeth 26' engage the rack 31 on the side of the groove 29 as shown in FIG. 11 (b), and a tooth of the four intermittent teeth teeth 27' engages the groove 29. As the intermittent gear 25' begins to turn around axis Z–Z' the occulting elements 17,17' also start revolving.

As the transverse shaft 19 provided with the intermittent gear 25' turns around the axis X–X', the intermittent gear 25' moves from left to right as illustrated in FIGS. 11 (b), (c) and (d), and a tooth of the intermittent gear 25' engages the groove 29 and the rack 31. As shown by the black point on a tooth of the eight transmittent teeth 26', the intermittent gear 25' turns around the axis Z–Z' for 90° through the rack and gear engagement. Then two of the four intermittent teeth 27' ride on the cylindrical rail 28, while the eight intermittent teeth 26' are positioned along the side of the cylindrical rail 28. Thus the intermittent gear 25 stops revolving as shown in FIG. 11 (e). While the intermittent gear 25' is turning around the axis Z–Z', the other intermittent gear 25 registers with the groove 30 of the cylindrical rail 28 and will not hinder the revolutions of the gear 25'. The gear 25' causes the transverse shaft 19 and the mount 18 to turn around the axis Z–Z' for 90°. The occulting element 17 will retreat from the occulting to the non-occulting position, while the other occulting element 17' will conversely move from the non-occulting to the occulting position.

With the replacement of the occulting element 17 with the other occulting element 17', the waxing and waning of the moon is transferred from the element 17 to the element 17'. Furthermore, as the replacement of the occulting element 17' with the other occulting element 17 is similarly accomplished upon 180° rotation of the occulting member about the axis X–X' both the occulting elements 17,17' together with the base 21, transverse shaft 19 and the mount 18 which are integral with the gear 32 rotate about the axis X–X' to replace with the occulting element 17 by rotating the gear 32 at the velocity V in a predetermined direction. By this, the image may be continuously and repeatedly projected to show the waxing and waning cycle from the full moon to new moon and back to the full moon. Furthermore, the replacement of the occulting elements according to the present invention can be carried out without affecting the projected image.

In addition, in the reverse motion of the celestial body as often performed for stage effect in a planetarium, the occulting elements 17,17' may project the moon image of the reverse phase from the moment of the reverse rotation of the axis X–X' regardless of the position of the intermittent gears 25,25' as these gears are always on the cylindrical rail or in meshing engagement with the groove 29 and the rack 31.

The occulting elements 17,17' are interchanged on the occasion of the full moon. On this occasion, the full moon state will apear, for they are not in the occulting position. However, the full moon state caused by their replacement must be shortened as much as possible, for the real full moon is seen from the globe only for a moment. For this purpose, the ratio between the diameter of the cylindrical rail 28 on which the intermittent gears 25,25' move and that of the pitch circle of the intermittent gears 25,25' are made large, and thus the duration of the full moon is shortened to less than about a half day during which the moon rises from the east and sets in the west.

The occulting elements 17,17' come into the occulting position with a time lag for the switching from the full moon state. Therefore, they abruptly occult the full moon image to make up for the time lag. As illustrated in FIG. 8, the relief angle β for preventing this abrupt occultation is given to the elements 17,17'. Because of the relief angle β, the elements 17,17' turning around the axis X–X' lead to the projection of a and e for the full moon, c for the new moon, and images deviating from the real moon phases for other moons as shown in FIG. 12.

For example, the position b of the real last quarter moon will be apart for the relief angle β from that b' of the projected one caused by the elements 17,17', while the position d of of the real first quarter moon will also be apart for the same angle from that d' of the projected one caused by the elements 17,17'. The positions b',d' will approach the side of the new moon c away from the real moon positions. The phases of the elements 17,17' different from the real moon phases can be compensated for by making the transmission axis 34 eccentric to the gear 33, by engaging the pin 35 of the transmission axis 34 with the lengthwise groove 36 of the gear 33, and then by changing the revolving speed of the gear 33.

In FIG. 13, when the phases of the elements 17,17' move on the basis of the last quarter moon b' with the change in the revolving speed V of the gear 32 engaged with the gear 33 as the sine curve, they can be made equal to the real moon phases by minimizing them for the new moon c, by retarding them for 2 β, twice the relief angle β, from the last quarter moon b' till the first quarter moon d', by maximizing them for the full moon a, e and by advancing them for 2 β from the first quarter moon d' till the last quarter moon b'.

The eccentricity between the transmission shaft 34 and the gear 33 is intended to make up for the phase dislocation caused by the relief angle $\beta$. It varies according to the relief angle $\beta$.

The abrupt occultation upon the interchange of the occulting elements is prevented and the moon images have no phase aberration projected by setting the relief angle $\beta$ to the eccentric mechanism of the driving part for the occulting elements.

The duration of the full moon state brought by the interchange of the occulting elements is further shortened due to the maximization of the revolving speed of the gear 32 by the eccentric mechanism.

Since the occulting elements are conical shaped with the same vertical angle as that of the convergent light reaching the group of projection lenses from the full moon plate, the leak of light or defective occultation is precluded. The real waxing and waning of the moon can be reproduced without any distortion, the beautiful knife-edged crescent moon can be projected, and thus the spectator can fully enjoy his presence at a life-like scene.

While there has been described and illustrated a preferred embodiment of the present invention, it is apparent that numerous alterations, omissions and additions may be made without departing from the spirit thereof.

We claim:

1. A planetarium moon projector comprising:
   projecting means for projecting an image of a moon onto a screen including a lamp, a condenser lens, a full moon plate and first and second occulting members;
   driving means for driving the moon projector in accordance with the movement of real moon;
   said first and second occulting members being alternatively rotatable about an axis perpendicular to the projecting means optical axis for occulting the projected moon and each of said occulting members being interchangeable with the other;
   changing means for interchanging said first occulting member with said second occulting member so as to move said second occulting member into the moon image projected path while transferring said first occulting member out of said image path;
   said changing means including a rotatable member supporting said occulting member and having an intermittent gear means on said rotatable member, said gear means being movable along a cylindrical rail having a rack means and centered about said axis perpendicular to said optical axis as said rotatable member is driven by said driving means and engageable with said rack means provided on said rail to interchange said first occulting member with said second occulting member.

2. A moon projector as in claim 1 wherein said projecting means projects a convergent circular light beam and said occulting members are each conically shaped with the same convergent angle as said convergent light beam.

3. A moon projector as in claim 1 wherein said occulting members are shaped with an occulting relief angle for preventing a wicked occultation in the interchange of said occulting members.

4. A moon projector as in claim 3 wherein said driving means includes a variable speed transmission eccentric mechanism for compensating for phasic aberration by said occulting members having said occulting relief angle.

5. A planetarium moon projector comprising means for producing a circular light beam, a projector lens disposed forwardly and along the optical axis of said light beam, a rotor rotatable about a first axis perpendicular to and intercepting said optical axis, a pair of first and second occulting members supported by and rotatable with said rotor and alternatively movable into operative occulting position relative to said light beam between said beam producing means and said projector lens, and means responsive to the rotation of one of said occulting members through a predetermined position about said first axis for interchanging the other occulting member therewith at said operative position.

6. The planetarium moon projector of claim 5 wherein each of said occulting members when rotated in their operative position about said first axis advance from a full moon occulting position through a new moon occulting position and then to a full moon occulting position, said occulting member interchange being effected while said operatively positioned occulting member is in its full moon position.

7. The planetarium moon projector of claim 6 comprising a bracket mounted on said rotor and rockable about a second axis perpendicular to and intercepting said first axis between opposite 90° spaced positions, said occulting members being mounted on said bracket with their optical axes spaced 90° about said second axis and said interchanging means comprises a pair of gears rotatable with and disposed on opposite sides of said bracket and coaxial with said second axis and a rack located in the path of said gears with the rotation of said rotor and engaging a gear when a respective occulting member is in its full moon position.

8. The planetarium moon projector of claim 5 wherein said beam producing means comprises in succession a lamp, a condenser lens and a moon plate having a circular moon delineating light transmitting area and produces a convergent beam, said occulting member each including a conical section having a rearwardly sidewardly facing base and a diametric semicircular cylindricl groove formed in apex end of said conical section.

9. A planetarium moon projector comprising means for producing a circular light beam convergent at a predetermined angle, a projector lens disposed forwardly and along the optical axis of said light beam, an occulting member disposed between said beam producing means and said projector lens and being frustoconical configuration with a transverse semicircular cylindrical groove formed in the reduced end thereof and means for rotating said occulting member about an axis intercepting and perpendicular to said optical axis and extending through the apex of said occulting member, the diameter of said groove being equal to that of said beam along said first axis and the longitudinal axis of said semicircular groove being perpendicular to and intersecting said optical and first axes when projecting a new moon.

10. The planetarium moon projector of claim 9 wherein the peripheral face of said occulting member coincides with the periphery of said beam when the axis of said occulting member and said optical axis coincide and the base portion of said occulting member is directed rearwardly.

* * * * *